B. S. BOWERS.
TESTING CASE FOR PNEUMATIC TUBES.
APPLICATION FILED OCT. 30, 1914.
1,169,918.
Patented Feb. 1, 1916.
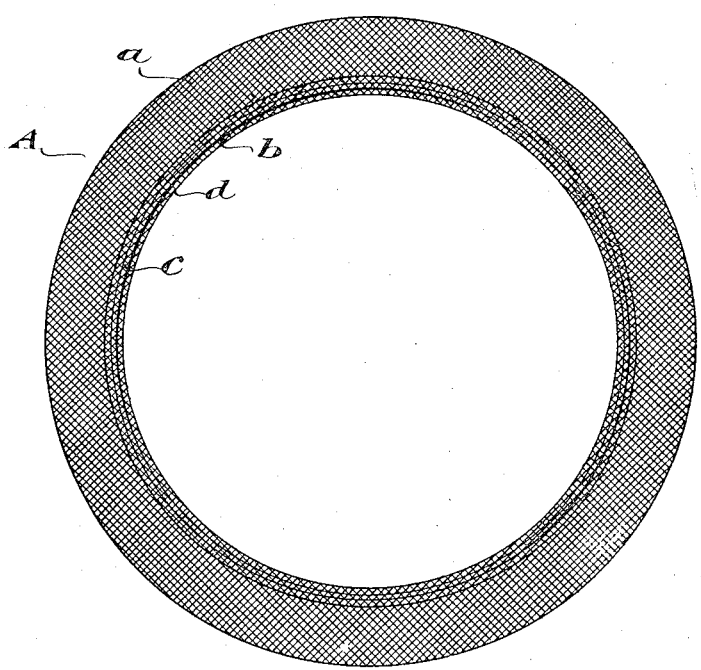
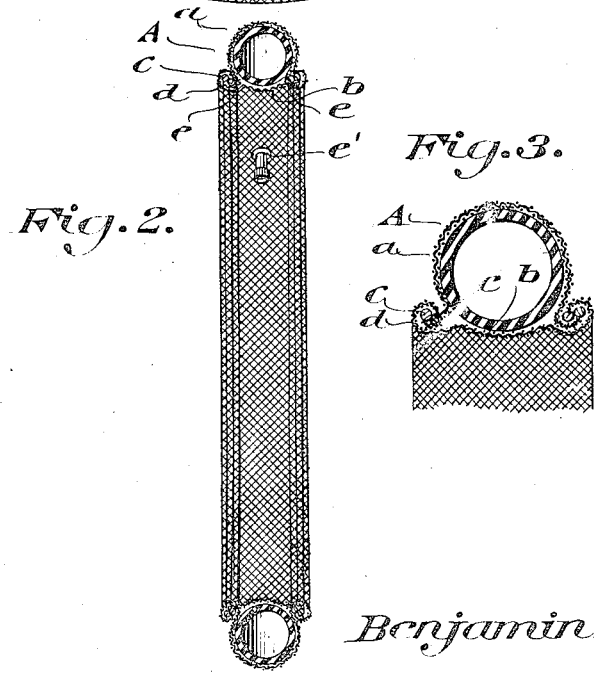
Witnesses
Inventor
Benjamin S. Bowers
By Victor J. Evans
Attorney

UNITED STATES PATENT OFFICE.

BENJAMIN S. BOWERS, OF LAPRAIRIE, MINNESOTA, ASSIGNOR TO JACOB CLOSZ, OF ST. ANSGAR, IOWA.

TESTING-CASE FOR PNEUMATIC TUBES.

1,169,918.  Specification of Letters Patent.  Patented Feb. 1, 1916.

Application filed October 30, 1914. Serial No. 869,440.

*To all whom it may concern:*

Be it known that I, BENJAMIN S. BOWERS, a citizen of the United States, residing at Laprairie, in the county of Itasca and State of Minnesota, have invented new and useful Improvements in Testing-Cases for Pneumatic Tubes, of which the following is a specification.

This invention relates to testing cases for pneumatic tubes, the object in view being to produce a simple device of general tubular construction, the same being foraminous and adapted to contain a pneumatic tube and permit the same to be highly inflated for the purpose of ascertaining the location of punctures and particularly those which are classified as slow leaks.

Under the ordinary method of ascertaining the location of a very small leak or puncture in the inner tube of a pneumatic tire, it is customary to inflate said inner tube after it has been removed from the outer case. If said inner tube is only inflated to the point of safety, in many cases the puncture or leak will not be in evidence and when the pressure is increased by pumping a greater volume of air into said tube, the air seeks the weakest point in the wall of the tube resulting in a blow out or the bursting of the tube.

Under the invention hereinafter described, the inner tube may be subjected to the full pressure allotted to it while contained in the outer case of the pneumatic tire and therefore when said tube has been inflated to such an extent and submerged in liquid such as water, the escape of air under such high pressure through the puncture will enable the repairman to ascertain the exact location of said puncture.

With the above and other objects in view, the invention consists in the novel construction, combination and arrangement of parts, as herein described, illustrated and claimed.

In the accompanying drawings: Figure 1 is a side elevation of a testing case for pneumatic tubes embodying the present invention. Fig. 2 is a diametrical section through the same. Fig. 3 is an enlarged cross section through the testing case, also showing the inner tube therein in cross section.

In carrying out the present invention, I provide an annular casing designated generally at A, said casing, in the preferred embodiment of this invention, comprising an outer section $a$ corresponding generally in its shape to the outer casing of a pneumatic tire, and an inner section $b$ corresponding in shape in cross section to the ordinary tire holding rim such as is commonly used in vehicle wheel structures of the present day for holding the outer case and inner tube of a pneumatic tire. The outer section $a$ is provided along its marginal edges with beads which are preferably reinforced by longitudinal wires $c$ and the inner section $b$ of the casing is provided with hook-shaped flanges $d$ which may also be reinforced with wires $e$ so that when the two sections of the casing are combined, the beads and flanges will interlock and prevent separation between the sections of the casing when the inner tube contained therein is fully inflated.

Both the outer and inner sections $a$ and $b$ of the casing A are composed of meshed fabric, wire strands of any suitable material and gage to withstand the pressure being employed in the make-up of the sections and the meshes or spaces between the wires or strands being of proper size to restrain the inflated tube and prevent the same from giving way or bursting under the internal pressure.

An inner tube after being removed from the outer casing of a pneumatic tire is placed in the outer section $a$ of the casing and then fully inclosed by combining the inner section $b$ of the casing with said outer section $a$. The valve stem of the tube may be passed through an opening $e$ in the inner section of the testing case. The tube is then inflated in the ordinary way until a pressure is obtained equal to the normal working pressure of said inner tube. The testing case with its contained inflated tube is then submerged in water or its equivalent whereupon the air escaping from the puncture or leak in said tube will rise in the form of bubbles to the surface of the water showing definitely the exact location of the leak without endangering the wall of the inner tube at any point. Considerable time and expense is thus saved and the life of the inner tube correspondingly increased.

It will, of course, be understood that the shape of the inner or rim section of the testing case is susceptible of considerable change as well as the means for locking the two sections of the case together as various locking expedients may be resorted to without departing from the principle or sacrificing any of the advantages of the invention.

It should be understood that the woven fabric, of which the case may be composed, is preferably a wire fabric, although other fabric of sufficient strength for the purpose may be employed, provided the weave is such that the interstices are of sufficient area to permit access of water to the tire tube when the testing device is immersed and also to permit the escape of air to generate air bubbles so that the leak may be located.

What I claim is:—

1. A testing device including a restraining tube of separable parts whereby a tire tube may be inserted and retained therein, said restraining tube having at least a part of its wall foraminous and its wall being adapted to contact, surround and reinforce the tire tube against bursting throughout the length of the restraining tube.

2. A testing case for pneumatic tubes consisting of a body, a part of which body at least is perforated, said body being designed to surround, contain and hold an entire inner tube against bursting when inflated and expose said tube through the perforations.

3. A testing case for pneumatic tubes consisting of a body, a part of which at least is perforated, said body being designed to surround, contain and hold an entire inner tube when inflated and expose said tube through the perforations, said perforations being of sufficiently restricted area to restrain said tube from blowing out through said perforations.

4. A tube testing device comprising a foraminous casing which is adapted to inclose the tube to be tested while the same is being inflated and which comprises two annular channel-shaped sections adapted to be connected with their concave sides facing each other.

5. A tube testing device comprising a foraminous casing which is adapted to inclose the tube to be tested while the same is being inflated and which comprises two annular channel-shaped sections adapted to be connected with their concave sides facing each other, and means for detachably connecting said sections.

In testimony whereof I affix my signature in presence of two witnesses.

BENJAMIN S. BOWERS.

Witnesses:
C. E. AIKEN,
LYMAN SEAMAN.